United States Patent [19]
Yen

[11] Patent Number: 5,740,381
[45] Date of Patent: Apr. 14, 1998

[54] EXPANDABLE ARBITRATION ARCHITECTURE FOR SHARING SYSTEM MEMORY IN A COMPUTER SYSTEM

[75] Inventor: Chih-Chan Yen, Hsinchu, Taiwan

[73] Assignee: United Microelectronics Corporation, Hsinchu, Taiwan

[21] Appl. No.: 577,555

[22] Filed: Dec. 22, 1995

[51] Int. Cl.$^6$ .............................. G06F 13/00; G06F 13/36
[52] U.S. Cl. ..................... 395/293; 395/296; 395/474; 395/728; 395/729; 364/DIG. 1
[58] Field of Search ........................ 395/293, 296, 395/474, 728, 729, 732

[56] References Cited

U.S. PATENT DOCUMENTS

| | | | |
|---|---|---|---|
| 4,818,985 | 4/1989 | Ikeda | 340/825.5 |
| 4,953,081 | 8/1990 | Feal et al. | 395/291 |
| 4,987,529 | 1/1991 | Craft et al. | 395/293 |
| 5,438,666 | 8/1995 | Craft et al. | 395/842 |
| 5,487,170 | 1/1996 | Bass et al. | 395/293 |
| 5,524,235 | 6/1996 | Larson et al. | 395/293 |
| 5,528,767 | 6/1996 | Chen | 395/293 |
| 5,546,548 | 8/1996 | Chen et al. | 395/293 |
| 5,555,382 | 9/1996 | Thaller et al. | 395/293 |
| 5,555,425 | 9/1996 | Zeller et al. | 395/293 |

*Primary Examiner*—Frank J. Asta
*Attorney, Agent, or Firm*—Cushman Darby & Cushman Intellectual Property Group of Pillsbury Madison & Sutro LLP

[57] ABSTRACT

An arbitration bus is arranged between a core logic chip set and a plurality of peripheral devices in order to arbitrate requests by the peripheral devices to use system memory of a computer system. Three or two arbitration signals carried on the arbitration bus. Means are provided to differentiate two levels of priority in each peripheral device. The core logic chip set can make a response pressing or otherwise so as to promote the overall performance. Preemption is provided so that peripheral devices can be overridden without wasting time when it is necessary to do so. Each peripheral device outputs a row address strobe (RAS) signal, all of which are connected together to form a open-collector signal to the core logic chip set for automatically accessing corresponding memory banks of system memory.

9 Claims, 6 Drawing Sheets

EXPANDABLE ARBITRATION ARCHITECTURE FOR SHARING SYSTEM MEMORY IN A COMPUTER SYSTEM

BACKGROUND OF THE INVENTION

1. Field of the Invention

The present invention relates in general to the architecture of a computer system. More specifically, the invention provides an expandable arbitration architecture that allows peripheral devices to share system memory.

2. Description of the Related Art

Figure 1:
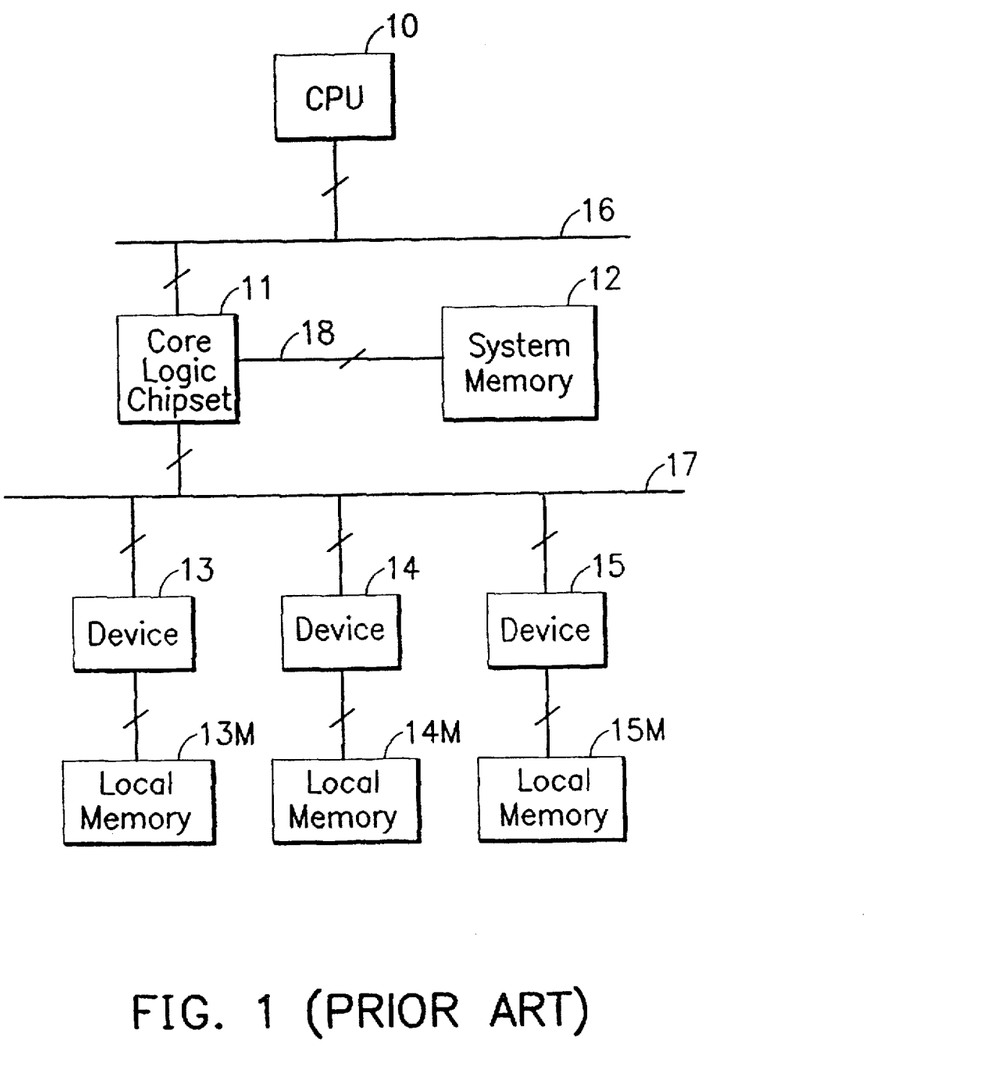
FIG. 1 (Prior Art) is a block diagram of the architecture of a conventional computer system.

FIG. 1 (Prior Art) is a block diagram of a conventional computer architecture. A CPU (central processing unit) 10 is coupled to a host bus 16, enabling it to communicate with a core logic chip set 11. Core logic chip set 11 communicates with a system memory 12 via a memory bus 18. The core logic chip set 11 is also coupled to a PCI (peripheral component interface) bus 17, whereby it communicates with various peripheral devices 13, 14, and 15. Each of peripheral devices 13, 14 and 15 has an associated local memory, 13M, 14M and 15M respectively, for storing and buffering data. For convenience, only three peripheral devices are shown. However, there could be any number of such devices, both in the conventional system and in the new computer architecture, to be described.

In the conventional computer system, each peripheral device such as devices 13, 14, and 15 might be a graphic system, a LAN (local area network) system, or an MPEG (motion picture experts group) system, etc. The CPU 10 executes the corresponding software ("driver") for each peripheral device. Requested data subsequently pass through the host bus 16, the core logic chip set 11, the PCI bus 17, and ultimately reach the appropriate peripheral device 13, 14, or 15. Then, the requested data are transmitted to the device's associated local memory, 13M, 14M, or 15M. This transmission path can be expressed as follows: CPU 10 → host bus 16 → core logic chip set 11 → PCI bus 17 → peripheral devices 13–15 → local memories 13M–15M. Much time is spent transmitting data through the buses between the CPU 10 and local memories 13M–15M, including the host bus 16 and the PCI bus 17, resulting in degradation of the overall performance. Moreover, it is wasteful to provide a local memory associated with each peripheral device such as memories 13M–15M.

If these peripheral devices could share the system memory 12 instead of relying on local memory, overall performance could be improved. However, sharing system memory causes another problem, namely—how to arbitrate among the needs of the various peripheral devices. Accordingly, there is a need for an expandable arbitration architecture to allow the sharing of system memory in a computer system.

SUMMARY OF THE INVENTION

It is therefore an object of the present invention to provide an expandable arbitration architecture for sharing computer system memory.

It is another object of the present invention to provide an expandable arbitration architecture for sharing a system memory so as to shorten the transmission path from CPU to the memory used by peripheral devices.

It is further another object of the present invention to provide an expandable arbitration architecture for sharing a system memory, through which peripheral devices can automatically address corresponding memory banks but which are not limited to specific banks of memory dedicated to each peripheral device.

The present invention achieves the aforementioned objects by providing an expandable arbitration architecture for sharing a system memory of a computer system. The basic elements of the architecture include: a core logic chip set; system memory; a plurality of peripheral devices;

a shared memory bus for connecting the core logic chip set, system memory and the peripheral devices; and an arbitration bus for connecting the peripheral devices with the core logic chip set.

The peripheral devices include means for generating first (normal priority) and second (high priority) request signals for requesting access to system memory via the shared memory bus and means for receiving a grant signal from the core logic chip set for granting system memory access. The peripheral devices can communicate with the system memory via the shared memory bus. The arbitration bus carries the first and second request signals from the peripheral devices to the core logic chip set and the grant signals from the core logic chip set to the peripheral devices. When a peripheral device issues a first request signal, the core logic chip set thereafter responds with the grant signal during a first predetermined time interval. When the peripheral device issues the second request signal, the core logic chip set thereafter responds with the grant signal during a second predetermined time interval. When the core logic chip set requests use of the system memory, a preemption feature renders the grant signal ineffective and thereafter first and second request signals are ineffective during a third predetermined time interval.

A second arrangement includes the same basic elements. However, the peripheral devices include means for generating a request signal (normal priority) and a request signal as a strobe (high priority) for requesting access to system memory via the shared memory bus and means for receiving a grant signal from the core logic chip set for granting access to system memory. The peripheral devices can communicate with the system memory via the shared memory bus. The arbitration bus carries the request signals and request strobe signals from the peripheral devices to the core logic chip set and the grant signals from the core logic chip set to the peripheral devices. When a peripheral device issues a request signal, the core logic chip set thereafter responds with the grant signal during a first predetermined time interval. When the peripheral device issues a request signal as a strobe, the core logic chip set thereafter responds with the grant signal during a second predetermined time interval. When the core logic chip set requests use of the system memory, a preemption feature renders the grant signal ineffective and thereafter an enabled request signal is ineffective during a third predetermined time interval.

BRIEF DESCRIPTION OF THE DRAWINGS

Other objects, features and advantages of the present invention will become apparent by way of the following detailed description of the preferred but non-limiting embodiment. The description is made with reference to the accompanying drawings, wherein.

DETAILED DESCRIPTION OF THE PREFERRED EMBODIMENTS

Figure 2:
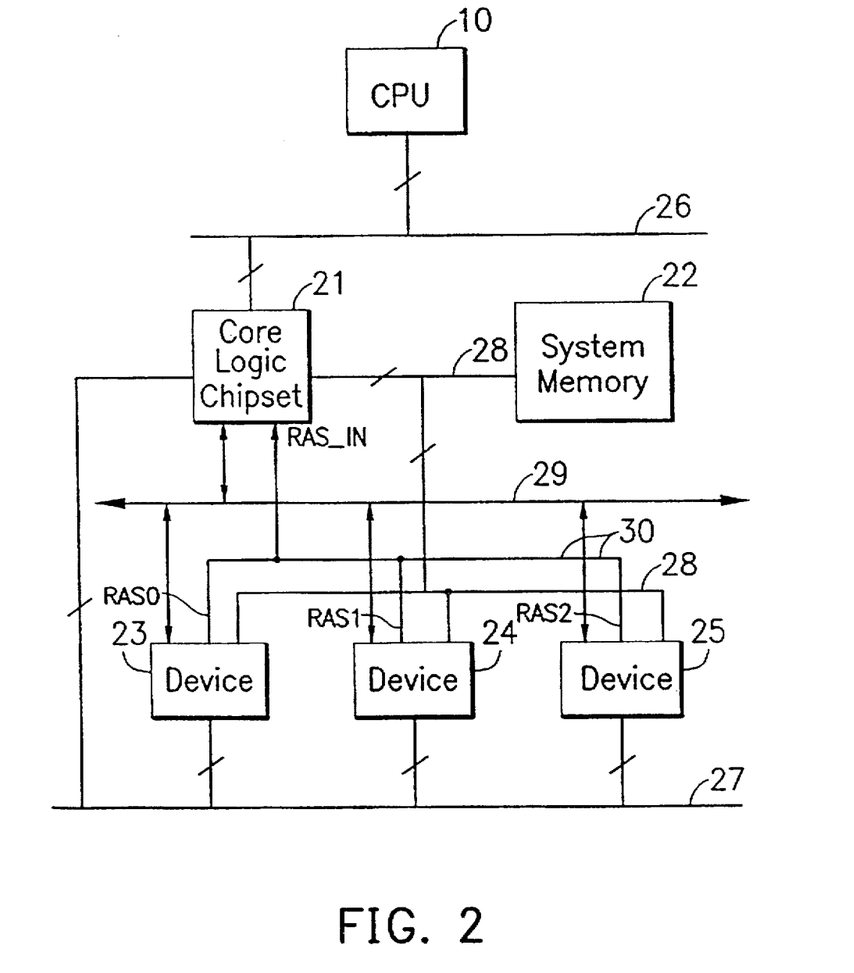
FIG. 2 is a block diagram of a computer system architecture according to the present invention.

FIG. 2 is a block diagram of a computer system architecture in accordance with the present invention. The computer system comprises: a CPU (central processing unit) 10, a core logic chip set 21, a system memory 22, and several peripheral devices 23, 24, 25, etc. Although only three (3) peripheral devices are shown and described, other numbers of peripheral devices can be used. The computer system further comprises: a host bus 26, a PCI (peripheral component interface) bus 27, a shared memory bus 28, and an arbitration bus 29. CPU 10 communicates with the core logic chip set 21 via the host bus 26. The core logic chip set 21 and the peripheral devices 23–25 communicate with system memory 22 via the shared memory bus 28. The core logic chip set 21 and the peripheral devices 23–25 are all connected to the PCI bus 27 for carrying out input/output operations. Strobe signals RAS0, RAS1, RAS2 from corresponding peripheral devices 23, 24, 25 are connected together as an open collector signal RAS_IN that is input to the core logic chip set 21. Reference numeral 30 denotes a line for connecting these strobe signals, RAS0, RAS1 and RAS2 output from the peripheral devices 23, 24, 25, etc. together in open-collector arrangement. For sharing the system memory 22, each peripheral device is connected to the core logic chip set 21 via the arbitration bus 29 and is controlled thereby.

Figure 3:
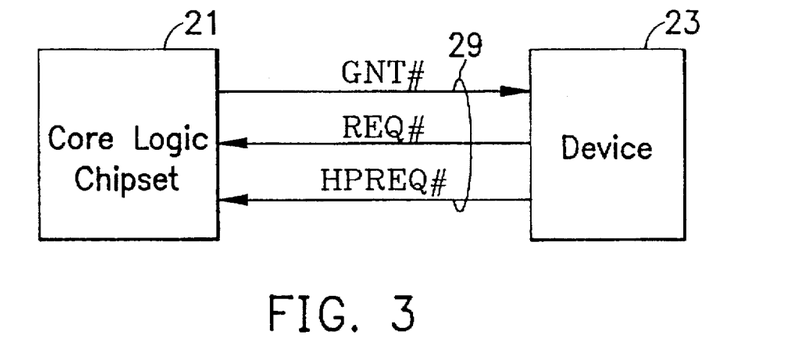
FIG. 3 is a block diagram showing greater detail of the arbitration bus according to the present invention.

FIG. 3 is a block diagram showing greater detail of the arbitration bus 29. The arbitration bus 29 carries three arbitration signals, GNT#, REQ#, and HPREQ#, that flow between each peripheral device, 23, 24, or 25 and the core logic chip set 21. Even though only three arbitration signals, GNT#, REQ#, and HPREQ#, are shown other signals could be used in accordance with the principles of the invention. A peripheral device, such as device 23, when it has a need to use system memory, outputs either a normal priority request signal REQ# or a high priority request signal HPREQ# which is carried by the arbitration bus 29 to the core logic chip set 21. If the request is granted, the core logic chip set 21 responds with a grant signal GNT#on the arbitration bus for the peripheral that made the request, device 23 in this example. In normal priority operation, REQ# is a request signal by which the peripheral device 23 requests the use of the system memory 22. In high priority operation, HPREQ# is a request signal by which the peripheral device 23 requests the use of the system memory 22. GNT# is a grant signal through which the peripheral device 23 is granted access by the core logic chip set 21 to the system memory 22. According to our convention, signals marked with "#" express that it is active-low. Of course, other conventions could be utilized within the scope of the present invention.

As depicted in FIG. 3, there are two request signals REQ# and HPREQ# so as to differentiate between a normal priority operation and a high priority operation. For example, let us assume that peripheral device 23 is a graphic system. Its normal operations require the use of system memory as follows:

(1) CRT refresh to prevent flicker;

(2) showing the position of hardware cursor, such as a mouse cursor; and (3) Graphic engine activity.

A computer user watching his monitor will immediately sense that something is wrong if the screen flickers or he does not see a response, such as a cursor or mouse movement, that he should see. Therefore, the appropriate systems are programmed such that items (1) and (2) cause a high priority request signal HPREQ# to be generated when system memory usage is required. However, the operation of the item (3) will occupy the shared memory bus 28 a great deal of time because of the massive data being input to or output from the system memory 22, but will not be immediately sensed by the user, the way screen flicker would be. Thus, item (3) would cause a normal priority request REQ#to issue when system memory usage is required. During the time intervals between accesses of the system memory 22 by the CPU 10, the core logic chip set 21 responds with the grant signal GNT# to the graphic system to process the operation of item (3).

Figure 4:
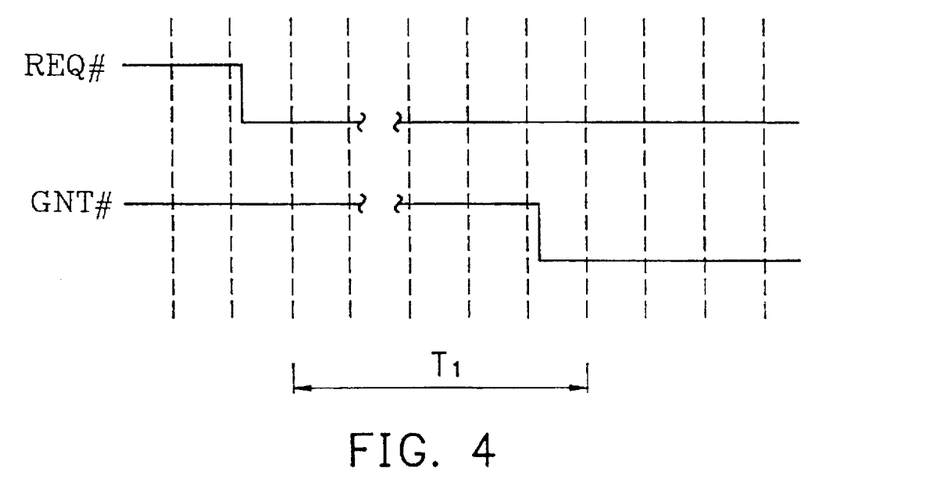
FIG. 4 is a timing diagram showing the timing relationship of a normal priority request REQ# and a grant GNT# in accordance with the arrangement shown in FIG. 3.

FIG. 4 is a timing diagram showing the timing relationship of a normal priority request REQ# and a grant GNT# in accordance with the arrangement shown in FIG. 3. During normal priority operation, there is a predetermined time interval T1 during which the request signal REQ# issues a request to use the system memory 22 until the core logic chip set 21 responds with a grant via GNT#.

Figure 5:
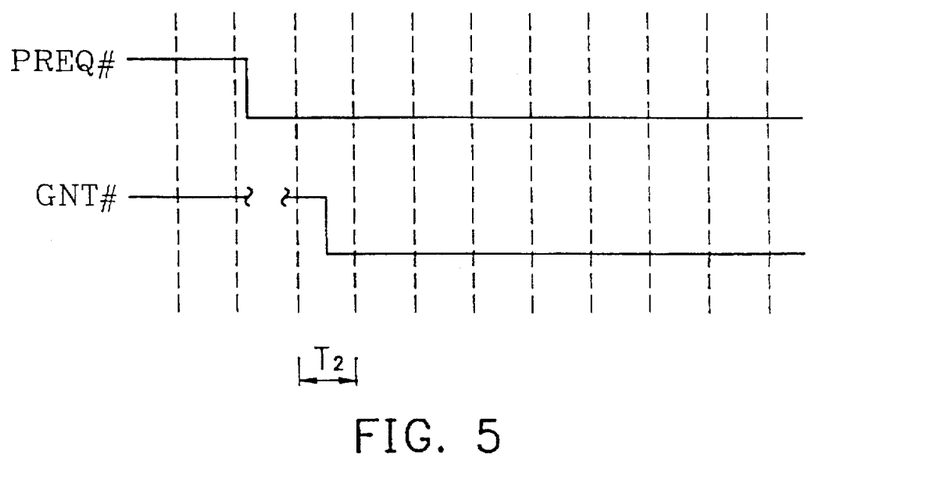
FIG. 5 is a timing diagram showing the timing relationship of a high priority request HPREQ# and a grant GNT#, in accordance with the arrangement shown in FIG. 3.

FIG. 5 is a timing diagram showing the timing relationship of a high priority request HPREQ# and a grant GNT#, in accordance with the arrangement shown in FIG. 3. In the case of a high priority request, there is a predetermined time interval T2 during which the request signal HPREQ# issues a request to use the system memory 22 until the core logic chip set 21 responds with a grant via GNT#. Note that T1>>T2 to differentiate between the normal priority and the high priority and is programmable depending on what the peripheral device 23 requires. Accordingly, such an arbitration protocol is suitable for differentiating the two kinds of processing priorities for accessing the system memory 22 in one peripheral device, 23, 24, or 25. By using two request signals REQ#and HPREQ#, the operations of the peripheral device are divided into two kinds of processing priorities, and then the core logic chip set 21 makes a response based on relative priorities and issues the appropriate grant signal GNT#, so as to optimize overall performance.

Figure 7:
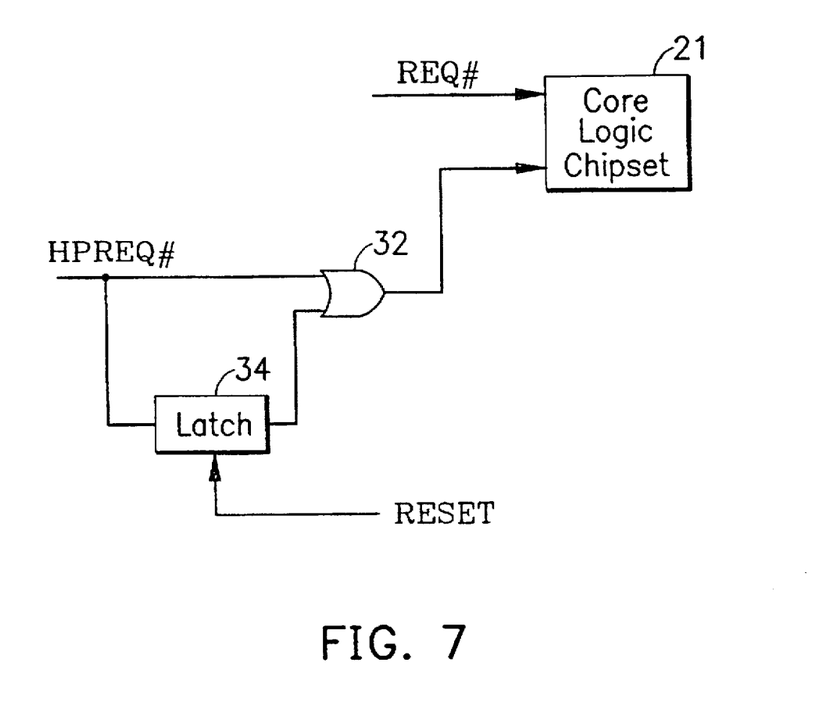
FIG. 7 is a circuit diagram showing an arrangement for disabling the high priority request HPREQ#.

If the peripheral device, such as device 23, performs only functions that are of the same priority level, a RESET signal (see FIG. 7) can be provided to disable the high priority request signal HPREQ# to a logic "high" level while resetting the computer. The core logic chip set 21 needs only to determine whether the REQ# is logic "low" or not, and does not respond to any high priority request signal HPREQ#. The circuit diagram for disabling the request signal HPREQ#, shown in FIG. 7, includes an OR gate 32 and a latch 34. The request signal HPREQ# is input to the OR gate 32 and latch 34. The RESET signal controls the latch 34 to output a logic "high" level signal to a second input signal of the OR gate 32. The output of the OR gate 32 is connected to the core logic chip set 21 instead of the core logic chip set receiving a direct connection as depicted in FIG. 3. As an alternative, if a peripheral device requires only high priority requests, the normal request signal REQ# can be disabled by the circuit shown in FIG. 7.

Figure 6:
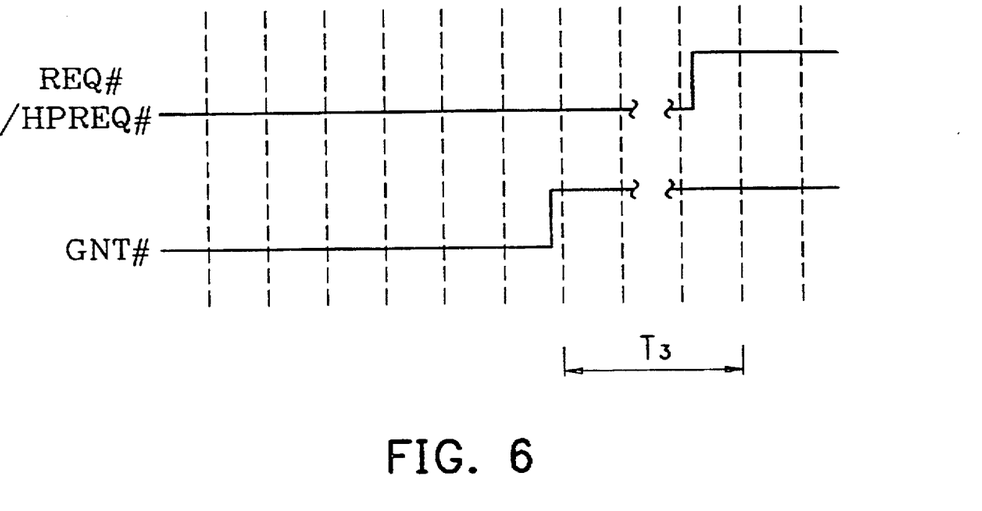
FIG. 6 is a timing diagram showing the timing relationship of concession of the peripheral device when the core logic chip set urgently demands system memory in accordance with the arrangement shown in FIG. 3.

The arbitration arrangement of the present invention allows for preemption. As shown in FIG. 6, when the CPU 10 enables the data register (not shown in the drawing) provided in the core logic chip set 21 to access the system memory 22 via the host bus 26, the core logic chip set 21 pulls the grant signal GNT#, which grants the peripheral device 23 the ability to use the system memory 22, to a "high" level. After that, there is a predetermined time interval T3 during which the peripheral device ceases to access the system memory 22 and pulls the HPREQ# or REQ# "high" level. When it recognizes that the HPREQ# or REQ# is at the "high" level, the core logic chip set 21 grants access to the system memory 22 without wasting much time. Time interval T3 is programmable depending on the user's needs.

Figure 8:
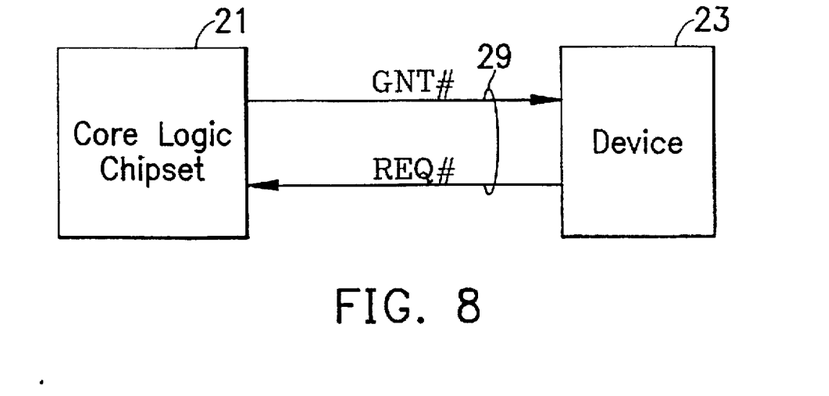
FIG. 8 is a block diagram of a second preferred embodiment of a computer architecture according to the present invention.

FIG. 8 is a block diagram of a second preferred embodiment of a computer architecture according to the present invention. In this arrangement there are only two arbitration signals, REQ# and GNT#, that flow between the core logic chip set 21 and each peripheral device 23, 24, or 25, respectively, on arbitration bus 29. A peripheral device issues a request REQ# and the core logic chip set 21 issues, in response, a grant GNT#. The REQ# signal is a request signal indicating that the peripheral signal requests the use of the system memory 22, and GNT# signal is a grant signal indicating that the peripheral device 23 is granted use of the system memory 22. Each arbitration signal marked with "#" represents that it is active-low. Of course, other conventions could be utilized within the scope of the present invention.

Figure 9:
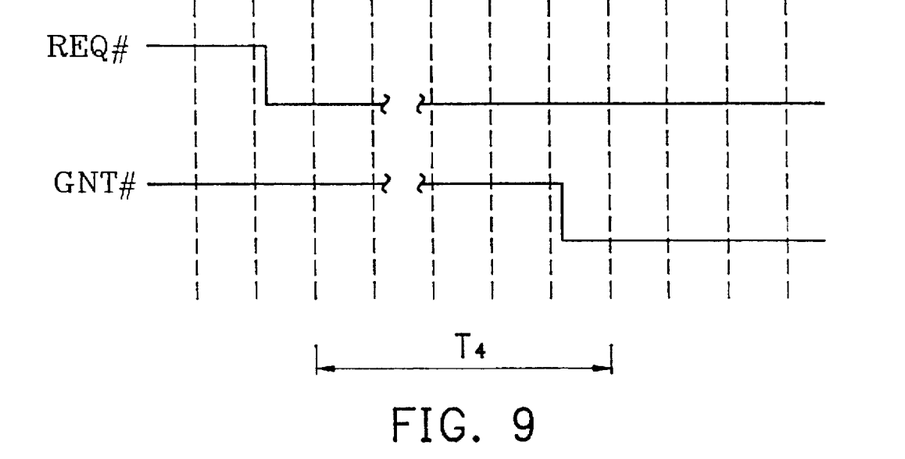
FIG. 9 is a timing diagram showing the timing relationship of a normal request REQ# and a grant, in accordance with the arrangement shown in FIG. 8.
Figure 10:
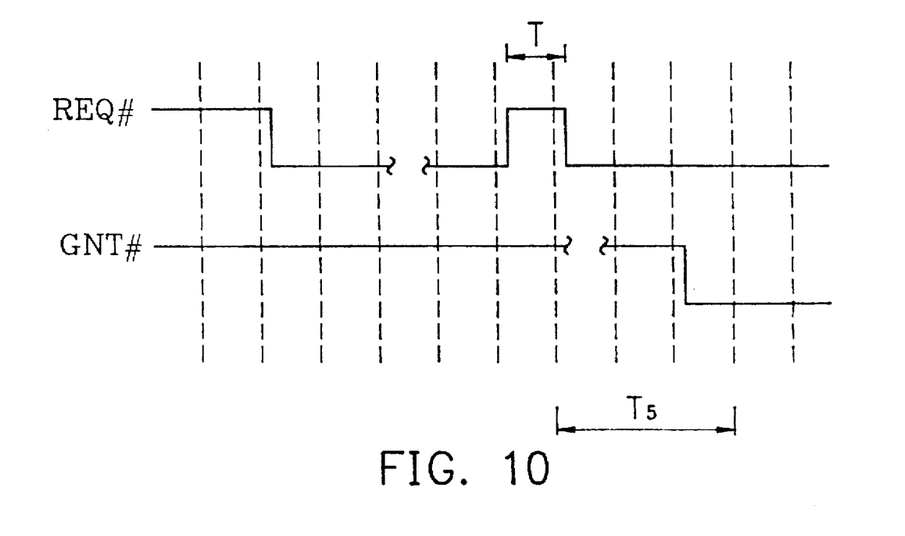
FIG. 10 is a timing diagram showing the timing relationship of a high priority requested and a corresponding grant GNT# in accordance with the arrangement shown in FIG. 8.

Even though there are only two signals in this arrangement, it can still differentiate between normal and high priority requests. High priority operations might be those such as the aforementioned CRT refresh or showing the position of the hardware cursor. Graphic engine activity would be a normal priority operation. As shown in FIG. 9, the timing diagram, when a normal priority operation is requested and then is granted, in accordance with FIG. 8, there is a predetermined time interval T4 during which the request signal REQ# is enabled to a "low" level until the core logic chip set 21 grants access by issuing grant signal GNT#. Referring to the FIG. 10 timing diagram, when a high priority operation is requested and then is granted, there is a predetermined time interval T5 during which the request signal REQ# is triggered as a strobe until the core logic chip set 21 grants access to memory by issuing the grant signal GNT#. Note that T4>>T5 and is programmable depending on the requirements of the peripheral device 23. Accordingly, such an arbitration protocol is suitable for differentiating two levels of priority for accessing the system memory 22 for each peripheral device, 23, 24, or 25. Based on whether the request signal REQ# is enabled as a strobe or not, the level of priority requested is determined and then the core logic chip set 21 makes a response pressing or otherwise by issuing a grant signal GNT#, accordingly, to the appropriate peripheral device so as to increase the overall performance efficiency of the computer system.

Figure 11:
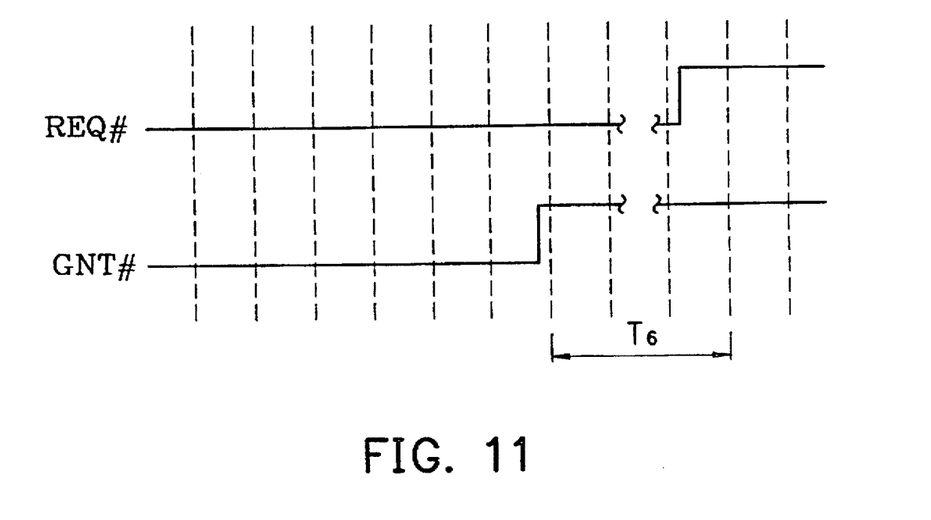
FIG. 11 is a timing diagram showing the timing relationship indicating concession of the peripheral device when the core logic chip set urgently demands system memory in accordance with the arrangement shown in FIG. 8.

The arrangement of FIG. 8 also allows for preemption. When the CPU 10 enables the data register (not shown in the drawing) provided in the core logic chip set 21 to access the system memory 22 via the host bus 26, the core logic chip set 21 pulls the grant signal GNT#, which grants the peripheral device 23 permission to use system memory 22, to a "high" level. After that, there is a predetermined time interval T6 (shown in FIG. 11) during which the peripheral device 23 discontinues accessing the system memory 22 and pulls the REQ##to a "high" level. After recognizing the REQ# "high" level, the core logic chip set 21 grants the access to the system memory 22 without wasting much time. Time interval T6 is programmable, depending on the user's needs.

In the conventional computer architecture, depicted in FIG. 1 (Prior Art), the CPU 10 executes the software driver of the peripheral device 13 and then stores the data in the local memory 13M thereof, while the transmission path as follows: CPU 10 → host bus 16 → core logic chip set 11 → PCI bus 17 → peripheral device 13 → local memory 13M. Accordingly, overall performance is degraded due to a long transmission path. However, in accordance with the present invention, the transmission path is changed to: CPU 10 → host bus 26 → core logic chip set 21 → shared memory bus 28 → system memory 22. As exemplified in the peripheral device 23, an SMBAR (share memory base address register) and an SMSR (share memory size register) are provided to address the portion of the system memory 22 used thereby. When the CPU 10 sends out the addressing value of SMBAR+SMSR, the core logic chip set 21 delivers the corresponding data to the system memory 22. If the addressing value is out of the range of the system memory 22, the required data of the peripheral device 23 are transmitted through the conventional path. Thus, if the software driver of the peripheral device can operate in accord, the overall performance will be enhanced.

Figure 12:
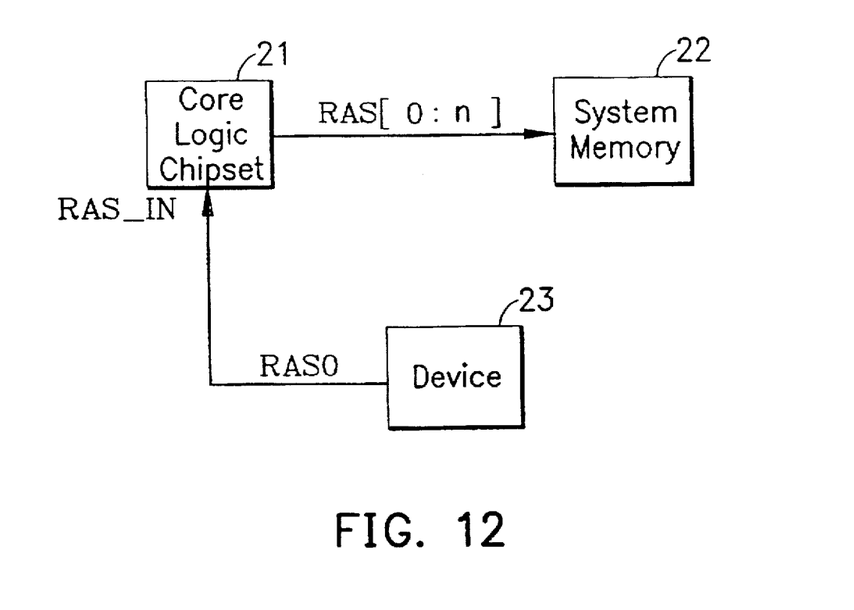
FIG. 12 is a schematic diagram of an arrangement whereby a peripheral device can address corresponding banks of memory according to the present invention.

Requested memory for each peripheral device is not too large. Therefore, each peripheral device merely provides a strobe signal RAS (Row Address Strobe) for accessing one memory bank. However, the system memory 22 has several memory banks which may have a different arrangement from computer to computer based on various user configurations. In a PC mother board, there are 30-pin sockets or 72-pin sockets for receiving 30-pin or 72-pin SIMMs, respectively. Four 30-pin SIMM sockets together, or each individual 72-pin socket functions as a memory bank. A user can add memory one bank at a time. Because the required memory for the peripheral devices 23-25 is not too great, in general smaller than one memory bank, only one strobe signal RAS for each peripheral device is needed to access the system memory 22. According to the present invention, the strobe signals, RAS0, RAS1, RAS2, as shown in FIG. 12, output from the peripheral device 23, 24, 25 are connected together to form an open-collector output RAS_IN to the core logic chip set 21. In the drawing, only one peripheral device 23 is exemplified. Since the core logic chip set 21 is connected to the system memory 22 via RAS[0:n], it can automatically provide access for the peripheral device 23-25 to the corresponding memory bank in the system memory 22 and is programmable depending on the device requirements.

The present invention provides an arbitration bus arranged between a core logic chip set and a plurality of peripheral devices in order to arbitrate the usage of a system memory by peripheral devices. Three or two arbitration signals are carried on the arbitration bus between the core logic chip set and each peripheral device. The present invention provides the ability to differentiate two levels of priority in one peripheral device. The core logic chip set can respond so as to promote overall system performance. Preemption is provided so as to avoid wasting much time when peripheral devices must be preempted. Each peripheral device outputs a row address strobe (RAS) signal, all of which are connected together to form a open-collector signal to the core logic chip set for automatically accessing the corresponding memory bank in the system memory.

What is claimed is:

1. An expandable arbitration architecture for sharing a system memory suited for a computer system, comprising:

a core logic chip set;

a system memory;

a plurality of peripheral devices;

a shared memory bus for connecting the core logic chip set, the system memory and the plurality of peripheral devices; and an arbitration bus for connecting the plurality of peripheral devices with the core logic chip set;

wherein the plurality of peripheral devices include:

request signalling means for generating first and second request signals through the arbitration bus to the core logic chip set for requesting access to the system memory via the shared memory bus; and grant signal receiving means for receiving a grant signal through the arbitration bus from the core logic chip set for granting access to the system memory, the plurality of peripheral devices can communicate with the system memory via the shared memory bus, when one of the plurality of peripheral devices issues a first request signal, the core logic chip set thereafter responds with the grant signal during a first predetermined time interval, when the one of the plurality of peripheral devices issues the second request signal, the core logic chip set thereafter responds with the grant signal during a second predetermined time interval, when the core logic chip set requests use of the system memory, the grant signal is ineffective and thereafter first and second request signals are ineffective during a third predetermined time interval, and a new peripheral device can be electrically connected to the shared memory bus and the arbitration bus thereby expanding the expandable arbitration architecture.

2. The expandable arbitration architecture as claimed in claim 1, wherein each of the plurality of peripheral devices comprises strobe signalling means for generating a row address strobe (RAS) signal, each strobe signalling means from each of the plurality of peripherals being connected together to form an open-collector signal input to the core logic chip set.

3. The expandable arbitration architecture as claimed in claim 1, wherein the first and the second request signals are provided to differentiate a normal priority and a high priority request, respectively.

4. The expandable arbitration architecture as claimed in claim 1, further comprising disabling means for disabling one of the first and the second request signals when one of the plurality of peripheral devices requires only one kind of priority.

5. The expandable arbitration architecture as claimed in claim 1, further comprising:

a PCI bus connecting the core logic chip set and the plurality of peripheral devices for carrying out I/O operations.

6. An expandable arbitration architecture for sharing a system memory suited for a computer system, comprising:

a core logic chip set;

a system memory;

a plurality of peripheral devices;

a shared memory bus for connecting the core logic chip set, the system memory and the plurality of peripheral devices; and an arbitration bus for connecting the plurality of peripheral devices with the core logic chip set;

wherein the plurality of peripheral devices include:

request signalling means for generating a request signal and a strobed request signal through the arbitration bus to the core logic chip set for requesting access to the system memory via the shared memory bus; and grant signal receiving means for receiving a grant signal through the arbitration bus from the core logic chip set for granting access to the system memory, the plurality of peripheral devices can communicate with the system memory via the shared memory bus, when one of the plurality of peripheral devices issues a request signal, the core logic chip set thereafter responds with the grant signal during a first predetermined time interval, when the one of the plurality of peripheral devices issues the strobed request signal, the core logic chip set thereafter responds with the grant signal during a second predetermined time interval, when the core logic chip set requests use of the system memory, the grant signal is ineffective and thereafter an enabled request signal is ineffective during a third predetermined time interval, and a new peripheral device can be electrically connected to the shared memory and the arbitration bus thereby expanding the expandable arbitration architecture.

7. The expandable arbitration architecture as claimed in claim 6, wherein each of the plurality of peripheral devices comprises strobe signalling means for providing a row address strobe (RAS) signal, each strobe signalling means from each of the plurality of peripheral devices being connected together to form an open-collector signal input to the core logic chip set.

8. The expandable arbitration architecture as claimed in claim 6, wherein the request signal being enabled as a strobe is provided to differentiate a normal priority request and a high priority request.

9. The expandable arbitration architecture as claimed in claim 6, further comprising:

a PCI bus connecting the core logic chip set and the plurality of peripheral devices for carrying out I/O operations.

* * * * *